United States Patent
Yu et al.

(10) Patent No.: US 9,824,684 B2
(45) Date of Patent: Nov. 21, 2017

(54) PREDICTION-BASED SEQUENCE RECOGNITION

(71) Applicant: Microsoft Technology Licensing, LLC, Redmond, WA (US)

(72) Inventors: Dong Yu, Bothell, WA (US); Yu Zhang, Cambridge, MA (US); Michael L. Seltzer, Seattle, WA (US); James G. Droppo, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 29 days.

(21) Appl. No.: 14/578,938

(22) Filed: Dec. 22, 2014

(65) Prior Publication Data

US 2016/0140956 A1  May 19, 2016

Related U.S. Application Data

(60) Provisional application No. 62/079,164, filed on Nov. 13, 2014.

(51) Int. Cl.

| | |
|---|---|
| G10L 15/00 | (2013.01) |
| G10L 15/04 | (2013.01) |
| G10L 17/00 | (2013.01) |
| G10L 15/08 | (2006.01) |
| G10L 15/16 | (2006.01) |

(52) U.S. Cl.
CPC .............. G10L 15/08 (2013.01); G10L 15/16 (2013.01)

(58) Field of Classification Search
CPC ........... G10L 15/08; G10L 15/06; G06N 3/08; G06N 4/0445; G06N 3/0454
USPC ................................ 704/232, 240, 250, 254
See application file for complete search history.

(56) References Cited

U.S. PATENT DOCUMENTS

| | | | | |
|---|---|---|---|---|
| 5,317,673 | A | * | 5/1994 | Cohen .................. G10L 15/144 704/232 |
| 5,604,839 | A | | 2/1997 | Acero et al. |
| 7,089,217 | B2 | | 8/2006 | Kasabov |
| 7,664,642 | B2 | * | 2/2010 | Espy-Wilson .......... G10L 15/02 704/254 |
| 8,126,710 | B2 | | 2/2012 | Gemello et al. |
| 9,263,036 | B1 | * | 2/2016 | Graves ................... G10L 15/16 |
| 2004/0002930 | A1 | * | 1/2004 | Oliver .................. G06K 9/6297 706/46 |

(Continued)

OTHER PUBLICATIONS

Ismail ae al, "Recurrent neural network with backpropagation through time for speech recognition," 2004, In Communications and Information Technology, 2004. ISCIT 2004. IEEE International Symposium on, 2004, pp. 98-102 vol. 1.*

(Continued)

Primary Examiner — Olujimi Adesanya
(74) Attorney, Agent, or Firm — Christopher J. Volkmann; Kelly, Holt & Christenson, PLLC

(57) ABSTRACT

A sequence recognition system comprises a prediction component configured to receive a set of observed features from a signal to be recognized and to output a prediction output indicative of a predicted recognition based on the set of observed features. The sequence recognition system also comprises a classification component configured to receive the prediction output and to output a label indicative of recognition of the signal based on the prediction output.

13 Claims, 14 Drawing Sheets

(56) References Cited

U.S. PATENT DOCUMENTS

| | | | | |
|---|---|---|---|---|
| 2007/0022068 | A1* | 1/2007 | Linsker | G05B 13/026 706/23 |
| 2010/0217589 | A1* | 8/2010 | Gruhn | G10L 15/063 704/232 |
| 2012/0065976 | A1 | 3/2012 | Deng et al. | |
| 2012/0072215 | A1* | 3/2012 | Yu | G06K 9/6296 704/240 |
| 2012/0239403 | A1* | 9/2012 | Cano | G10L 15/02 704/254 |
| 2013/0138589 | A1* | 5/2013 | Yu | G06N 3/08 706/25 |
| 2014/0257805 | A1* | 9/2014 | Huang | G10L 15/063 704/232 |

OTHER PUBLICATIONS

Gupta et al, "Classification of temporal sequences via prediction using the simple recurrent neural network", 2000, In Pattern Recognition, 33(10), pp. 1759-1770.*

Rumelhart ert al "Learning representations by back-propagating errors", 1986, In Nature, 323, pp. 533-536.*

Pinto et al, "Analysis of MLP-Based Hierarchical Phoneme Posterior Probability Estimator," in IEEE Transactions on Audio, Speech, and Language Processing, vol. 19, No. 2, pp. 225-241, Feb. 2011.*

Graves et al, "Framewise Phoneme Classification with Bidirectional LSTM and Other Neural Network Architectures", 2005, In Neural Networks, vol. 18, Nos. 5-6, pp. 602-610.*

Petrović et al, "Kalman Filter and NARX Neural Network for Robot Vision based Human Tracking", Jul. 15, 2013, FACTA Universitatis Series: Automatic Control and Robotics, vol. 12, No. 1, pp. 43-51, 2013.*

Seltzer et al, "Multi-task learning in deep neural networks for improved phoneme recognition," May 2013, In IEEE International Conference on Acoustics, Speech and Signal Processing, Vancouver, BC, 2013, pp. 6965-6969.*

Iiguni et al, "A real-time learning algorithm for a multilayered neural network based on the extended Kalman filter," 1992, in IEEE Transactions on Signal Processing, vol. 40, No. 4, pp. 959-966, Apr. 1992.*

Yu, "Deep Neural Network and Its Application in Speech Recognition.", Nov. 2013, Tutorial at NLP&CC 2013, pp. 1-62.*

Zhang et al, "Prediction-adaptation-correction recurrent neural networks for low-resource language speech recognition," 2016 IEEE International Conference on Acoustics, Speech and Signal Processing (ICASSP), Shanghai, 2016, pp. 5415-5419.*

Zhang,"Speech recognition with prediction-adaptation-correction recurrent neural networks," Aug. 2015, 2015 IEEE International Conference on Acoustics, Speech and Signal Processing (ICASSP), South Brisbane, QLD, 2015, pp. 5004-5008.*

International Search Report and Written Opinion for International Application No. PCT/US2015/059361, dated Feb. 3, 2016, date of filing: Nov. 6, 2015, 12 pages.

Martin Wollmer et al., "A Novel Bottleneck-BLSTM Front-End for Feature-Level Context Modeling in Conversational Speech Recognition", 2011 IEEE Workshop on Automatic Speech Recognition and Understanding, Dec. 11-15, 2011, 6 pages.

Baltersee, et al., "Nonlinear Adaptive Prediction of Speech with a Pipelined Recurrent Neural Network" In Proceeding of IEEE Transactions on the Signal Processing, vol. 46, Issue 8, Aug. 1998, 12 pages.

Arisoy, et al., "Deep Neural Network Language Models", In Proceedings of the 7th Workshop on Innovative Use of NLP for Building Educational Applications, Jun. 8, 2012, 9 pages.

Jalalvand, Shahab, "Improving Language Model Adaptation using Automatic Data Selection and Neural Network", In Proceedings of the Student Research Workshop associated with RANLP, Sep. 9, 2013, 7 pages.

Mellouk, et al., "A Discriminative Neural Prediction System for Speech Recognition", In Proceeding of the IEEE International Conference on Acoustics, Speech, and Signal Processing, vol. 1, Apr. 27, 1993, 3 pages.

Roy, et al. "Visual Context Driven Semantic Priming of Speech Recognition and Understanding", In Proceeding of the Computer Speech and Language, Apr. 26, 2005, 12 pages.

Parada, et al.,Contextual Information Improves OOV Detection in Speech, In Proceeding of the Annual Conference of the North American Chapter of the Association for Computational Linguistics, Jun. 2010, 9 pages.

Hinton, et al., "Deep Neural Networks for Acoustic Modeling in Speech Recognition", In Proceeding of IEEE Signal Processing Magazine, vol. 29, Issue 6, Apr. 27, 2012, 27 pages.

Amrouche, et al., "A Robust Speech Recognition System Using a General Regression Neural Network", In Proceeding of the International Scientific Journal of Computing, vol. 6, Issue 3, Retrieved on: Oct. 30, 2014, 10 pages.

Connor, et al., "Extensions of Recurrent Neural Network Language Model", In Proceeding of the IEEE Transactions Neural Networks, vol. 5, No. 2, Mar. 1994, 4 pages.

Dahl, George E., et al. "Context-dependent pre-trained deep neural networks for large-vocabulary speech recognition." Audio, Speech, and Language Processing, IEEE Transactions on 20.1 (2012): 13 pages.

Seide, Frank, Gang Li, and Dong Yu. "Conversational Speech Transcription Using Context-Dependent Deep Neural Networks." Interspeech. 2011. 4 pages.

Seltzer, Michael L., Dong Yu, and Yongqiang Wang. "An investigation of deep neural networks for noise robust speech recognition." Acoustics, Speech and Signal Processing (ICASSP), 2013 IEEE International Conference on. IEEE, 2013. 5 pages.

Sainath, Tara N., et al. "Deep convolutional neural networks for LVCSR." Acoustics, Speech and Signal Processing (ICASSP), 2013 IEEE International Conference on. IEEE, 2013. 5 pages.

Sainath, Tara N., et al. "Improvements to deep convolutional neural networks for LVCSR." Automatic Speech Recognition and Understanding (ASRU), 2013 IEEE Workshop on. IEEE, 2013. 6 pages.

Graves, Alex, Abdel-rahman Mohamed, and Geoffrey Hinton. "Speech recognition with deep recurrent neural networks." Acoustics, Speech and Signal Processing (ICASSP), 2013 IEEE International Conference on. IEEE, Mar. 2013. 5 pages.

Graves, Alex, Navdeep Jaitly, and Abdel-rahman Mohamed. "Hybrid speech recognition with deep bidirectional LSTM." Automatic Speech Recognition and Understanding (ASRU), 2013 IEEE Workshop on. IEEE, 2013. 6 pages.

Sak, Hasim, Andrew Senior, and Françoise Beaufays. "Long short-term memory recurrent neural network architectures for large scale acoustic modeling." Proceedings of the Annual Conference of International Speech Communication Association (INTERSPEECH). Sep. 2014. 5 pages.

Huang, Van, et al, "A comparative analytic study on the gaussian mixture and context dependent deep neural network hidden markov models," Interspeech (Sep. 2014). 5 pages.

Weng, Chao, et al. "Single-channel mixed speech recognition using deep neural networks." Proc. ICASSP. May 2014. 5 pages.

Kalman, Rudolph Emil. "A new approach to linear filtering and prediction problems" Journal of Fluids Engineering 82.1 (Mar. 1960): 35-45.

Weng, Chao, et al. "Recurrent deep neural networks for robust speech recognition." Proc. of ICASSP, Florence, Italy (May 2014). 5 pages.

Williams, Ronald J., and Jing Peng. "An efficient gradient-based algorithm for on-line training of recurrent network trajectories." Neural Computation 2.4 (1990). 12 pages.

Seide, Frank, et al. "Feature engineering in context-dependent deep neural networks for conversational speech transcription." Automatic Speech Recognition and Understanding (ASRU), 2011 IEEE Workshop on. IEEE, 2011. 6 pages.

Jaitly, Navdeep, Vincent Vanhoucke, and Geoffrey Hinton. "Autoregressive product of multi-frame predictions can improve the

(56) References Cited

OTHER PUBLICATIONS accuracy of hybrid models." Fifteenth Annual Conference of the International Speech Communication Association, Sep. 2014. 5 pages.
Deng, Li, and Jianshu Chen. "Sequence classification using the high-level features extracted from deep neural networks." Proc. ICASSP. May 2014. 5 pages.
"Second Written Opinion Issued in PCT Application No. PCT/US2015/059361", dated Sep. 26, 2016, 5 Pages.
"International Preliminary Report on Patentability Issued in PCT Application No. PCT/US2015/059361", dated Jan. 31, 2017, 7 Pages.

* cited by examiner

PREDICTION-BASED SEQUENCE RECOGNITION

CROSS-REFERENCE TO RELATED APPLICATION

The present application is based on and claims the benefit of U.S. provisional patent application Ser. No. 62/079,164, filed Nov. 13, 2014, the content of which is hereby incorporated by reference in its entirety.

BACKGROUND

Computer systems are currently in wide use. Some such computer systems receive input signals and perform sequence recognition to generate a recognition result from the input signals. Examples of sequence recognition include, but are not limited to, speech recognition, handwriting recognition, character recognition, image recognition and/or computer vision. In such systems, one example machine learning task includes sequence labeling that involves an algorithmic assignment of a categorical label to each member of a sequence of observed values.

In one example speech processing system, a speech recognizer receives an audio input signal and, in general, recognizes speech in the audio signal, and may transcribe the speech into text. A speech processing system can also include a noise suppression system and/or an audio indexing system that receives audio signals and indexes various characteristics of the signal, such as a speaker identity, subject matter, emotion, etc. A speech processing system can also include speech understanding (or natural language understanding) systems, that receive an audio signal, identify the speech in the signal, and identify an interpretation of the content of that speech. A speech processing system can also include a speaker recognition system that receives an audio input stream and identifies the various speakers that are speaking in the audio stream and/or a distance of the speakers to the microphone that captured the audio input stream. Another function often performed is speaker segmentation and tracking, also known as speaker diarization.

The discussion above is merely provided for general background information and is not intended to be used as an aid in determining the scope of the claimed subject matter.

SUMMARY

A sequence recognition system comprises a prediction component configured to receive a set of observed features from a signal to be recognized and to output a prediction output indicative of a predicted recognition based on the set of observed features. The sequence recognition system also comprises a classification component configured to receive the prediction output and to output a label indicative of recognition of the signal based on the prediction output. In one example, the sequence recognition system utilizes a machine learning framework to adapt the behavior of the prediction and classification components and to correct the outputs generated by the prediction and classification components.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
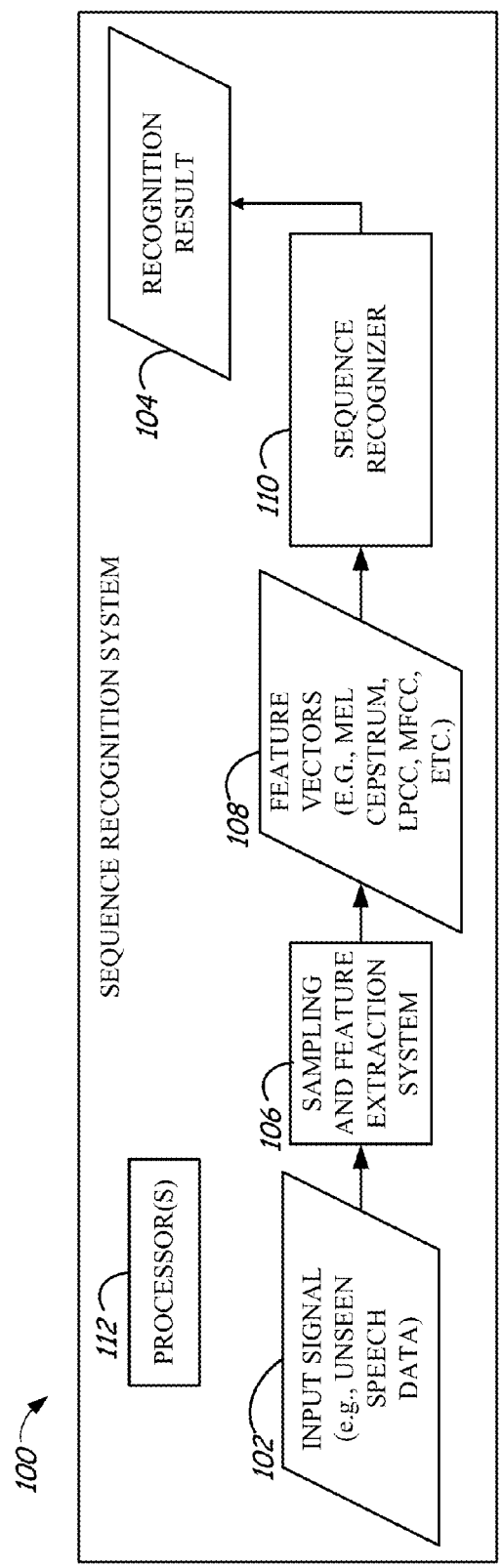
FIG. 1 is a block diagram of one example of a sequence recognition system.

FIG. 1 is a block diagram of one example of a sequence recognition system 100 that receives an input signal or data 102 for which a recognition result 104 is to be generated. In one example, input signal 102 represents a physical entity that is sensed using one or more sensors. For example, but not by limitation, input signal 102 can represent an audio stream, an image or images, a user handwriting sample, etc. In this manner, system 100 can be used to perform any of a number of recognition applications. For example, but not by limitation, system 100 can be used to recognize speech, handwriting, and/or images. In a handwriting recognition example, input data 102 is indicative of a user handwriting input for which sequence recognition system 100 recognizes characters from the input. In an image recognition example, system 100 can be used for computer vision applications. In a speech application, system 100 can be used for speaker recognition, speech understanding, noise suppression, audio indexing, and/or automatic transcription. Further, components of system 100 can be used for predicting speaking rate, clean speech frames, and/or noise frames. These, of course, are examples only.

For the sake of discussion, but not by limitation, examples will be described herein in the context of speech recognition. However, one skilled in the art will understand that the described concepts can be applied to other forms of sequence recognition.

Before describing the operation of system 100 in more detail, a brief overview of some of the items in system 100 and their operation, will first be provided. As illustrated in FIG. 1, input data 102 (unseen speech data in the present example) is provided during runtime to a sampling and feature extraction system 106. System 106 samples the unseen speech data 102 and extracts features in the form of observation feature vectors 108. In one example, system 106 generates frames and extracts features corresponding to the frames of the speech data. By way of example, but not by limitation, the feature vectors 108 can be Mel Cepstrum features (e.g., Mel-frequency cepstral coefficients (MFCCs)), linear predictive Cepstral coefficients (LPCCs), among a wide variety of other acoustic or non-acoustic features. Feature vectors 108 are provided to a sequence recognizer 110 which generates recognition result 104 for input data 102. In one example, recognition result 104 comprises phonemes for an utterance that is provided to a language model to identify a word sequence. System 100 includes one or more processors 112 for performing the functions within sequence recognition system 100.

Figure 2:
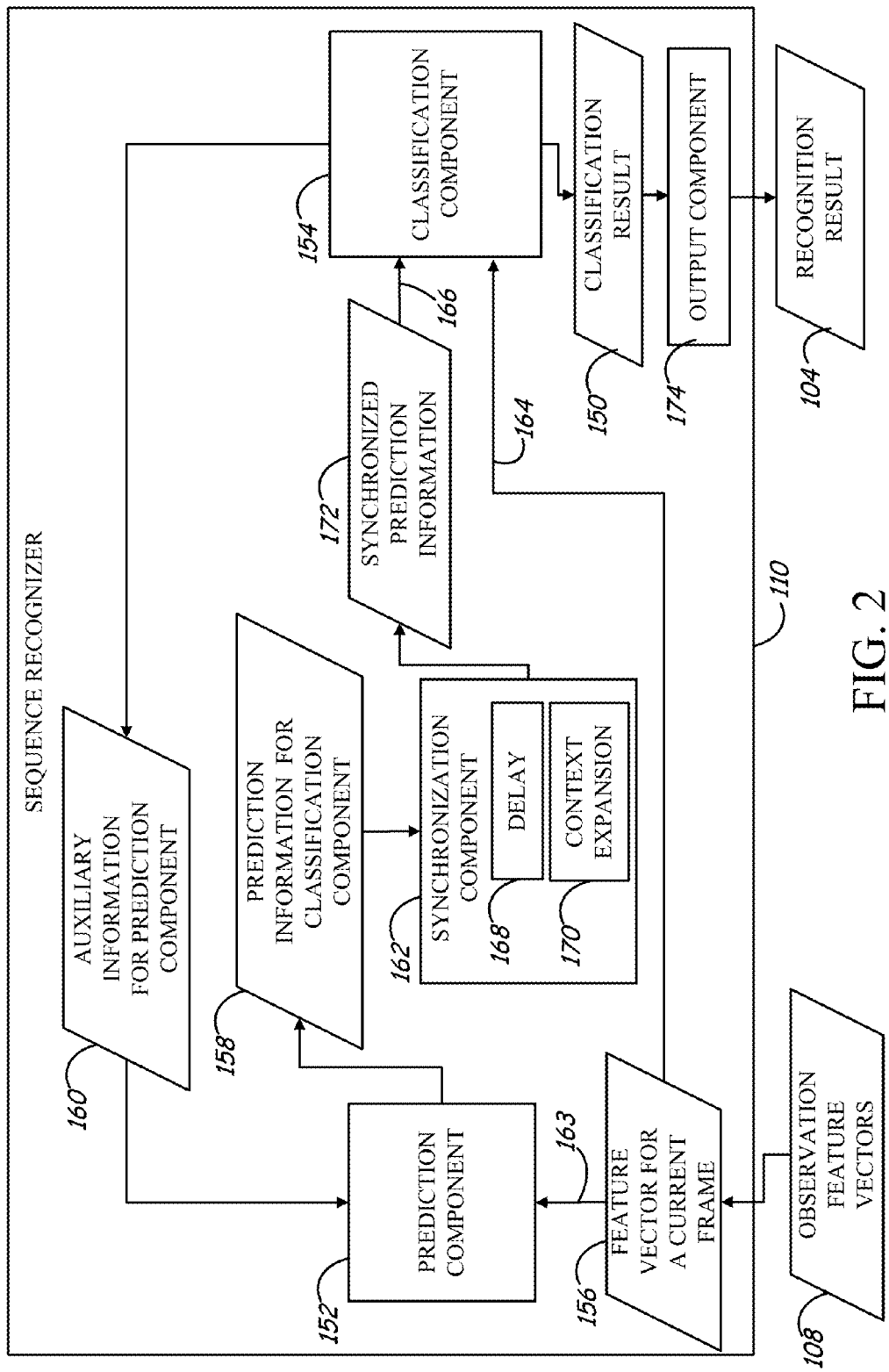
FIG. 2 is a block diagram showing one example of a sequence recognizer.

FIG. 2 is a block diagram showing one example of sequence recognizer 110. As shown in FIG. 2, observation feature vectors 108 are received by sequence recognizer 110 to generate a classification result 150. Sequence recognizer 110 includes a prediction component 152 and a classification component 154.

Classification component 154 is configured to output classification result 150 indicative of recognition of the input data or signal. In one example, classification component 154 receives a set of observed features for each frame of the input data or signal, and outputs classification result 150 comprising a state label for each frame based on the set of observed features for that frame. For instance, classification component 154 can output a phoneme label for a current frame of the input speech data based on the feature vector 156 for that current frame.

Prediction component 152 is configured to receive the set of observed features for a given frame, and to output a prediction output indicative of a predicted recognition based on the set of observed features for the given frame. As discussed in further detail below, in one example prediction component 152 generates predictions of a next state (e.g., a next phoneme), for a future frame, based on features for a current frame. Alternatively, or in addition, prediction component 152 can generate predictions of a next speaker, speaking rate, noise condition, and/or any other information that can be used to enhance the accuracy of classification component 154.

Sequence recognizer 110 illustratively comprises a machine learning framework in which the behavior of prediction component 152 and classification component 154 is adapted based on feedback. In the illustrated example, feedback results (e.g., auxiliary information 160) to prediction component 152 from classification component 154 are used to adapt prediction component 152 in generating improved or more accurate predictions for future frames. Further, feedback results (e.g., prediction information 158) to classification component 154 from prediction component 152 are used to adapt classification component 154 in generating improved or more accurate classifications. In one implementation, the machine learning framework can be viewed as correcting a prediction made by prediction component 152. Since auxiliary information 160 from classification component 154 depends on prediction information 158 from prediction component 152, and vice versa, a recurrent loop is formed. As discussed in further detail below, the present description provides a wide variety of technical advantages. For example, but not by limitation, it provides a machine learning architecture for a classifier that leverages a prediction on observed features to generate a classification result. The components are dynamically adapted and corrected to improve the classification result (e.g., phoneme accuracy, etc.).

Before describing the operation of sequence recognizer 110 in further detail, prediction component 152 and classification component 154 will be discussed. Briefly, components 152 and 154 can comprise any suitable architecture of analyzing the observation feature vectors 108. For example, components 152 and 154 can each comprise an acoustic model, such as, but not limited to, Hidden Markov Models (HMMs) which represent speech units to be detected by recognition system 100. In the illustrated example, sequence recognizer 110 comprises a recurrent neural network in which each of prediction component 152 and classification component 154 comprise artificial neural networks (e.g., deep neural networks (DNNs)). While examples are described herein in the context of neural network based prediction and classification, one skilled in the art understands that other types of components and models can be utilized.

Figure 3:
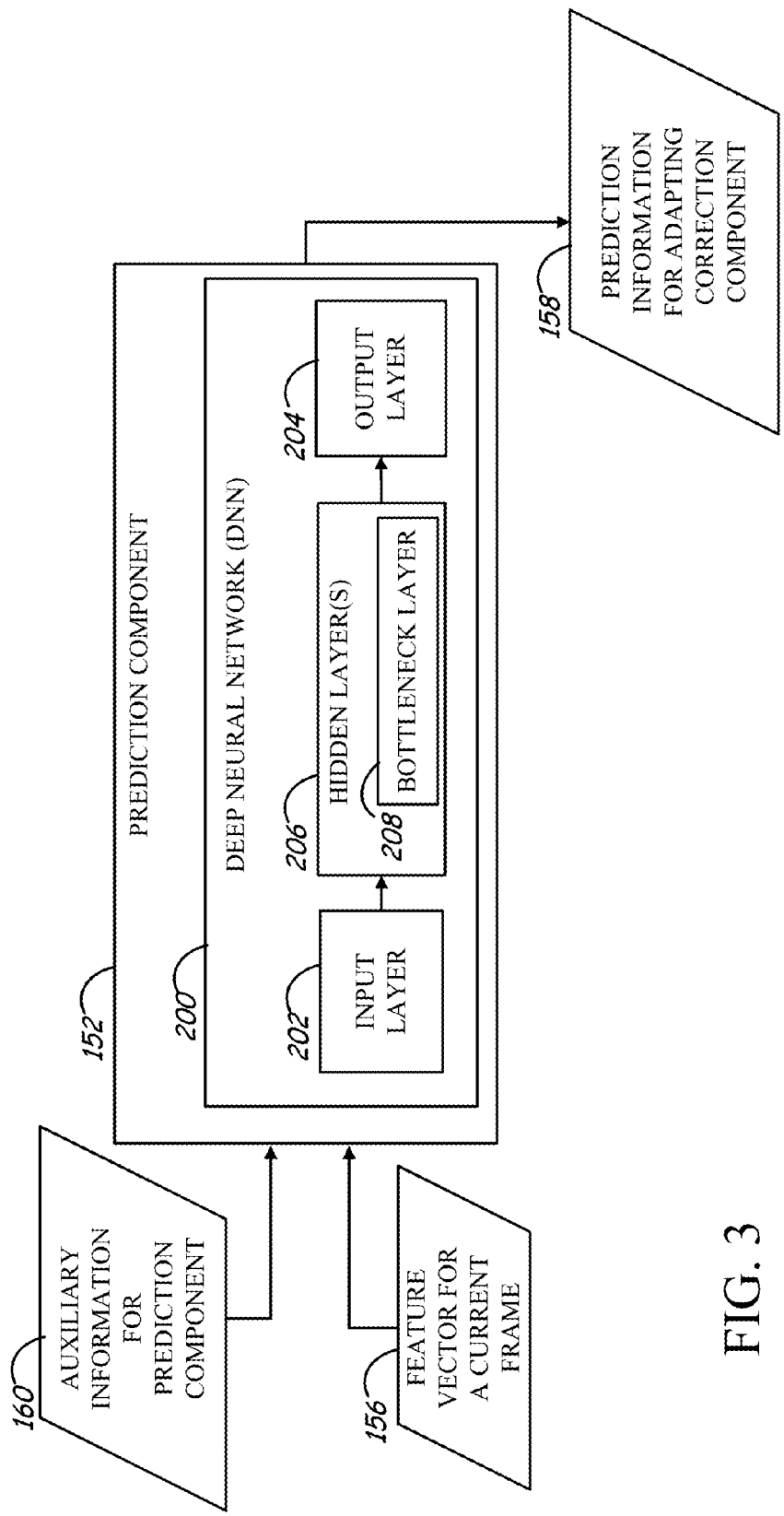
FIG. 3 is a block diagram showing one example of a neural network-based prediction component.

FIG. 3 is a block diagram of one example of prediction component 152. Prediction component 152 includes a deep neural network (DNN) 200 having an input layer 202, an output layer 204, and one or more hidden layers 206 between input layer 202 and output layer 204.

Input layer 202 receives the feature vector 156 for a current frame and the auxiliary information 160 from classification component. In one example, the information in input layer 202 is processed by one or more sigmoid layers that perform sigmoid functions within DNN 200. As understood by one skilled in the art, a sigmoid function can be used in artificial neural networks to introduce nonlinearity into the model. A neural network element can compute a linear combination of its input signals, and applies a sigmoid function to the result. The sigmoid function can satisfy a property between the derivative and itself such that it is computationally easy to perform.

In one example, hidden layer 206 includes a set of nodes that feed into a set of output nodes in output layer 204. Based on feature vector 156 and auxiliary information 160, output layer 204 outputs a prediction output indicative of a predicted recognition. In one particular example, DNN 200 predicts a posterior probability for a future frame, which can be the next contiguous frame, following the current frame, or some other future frame. For instance, the prediction output can be a posterior probability of a state (e.g., a phone) for the future frame, based on feature vector 156 of the current frame and auxiliary information 160 generated by classification component 154. In one example, output layer 204 comprises a softmax function that converts raw value(s) into the posterior probability.

In the illustrated example, at least one of the hidden layer(s) 206 comprises a bottleneck layer 208 between input layer 202 and output layer 204. In one example, bottleneck layer 208 comprises a special hidden layer in which the number of nodes or neurons is less than the other hidden layers. Bottleneck layer 208 operates as a dimension reduction layer in DNN 200.

While the prediction information 158 can be obtained from either the output layer 204 or a hidden layer 206, such as bottleneck layer 208, in large vocabulary speech recognition tasks there are often a large number of states (e.g., over 5,000 states). In this case, obtaining the information from the output layer 204 can significantly increase the model size. In one example, the information is obtained from a hidden layer 206 whose size can be set independent of the state size.

Figure 4:
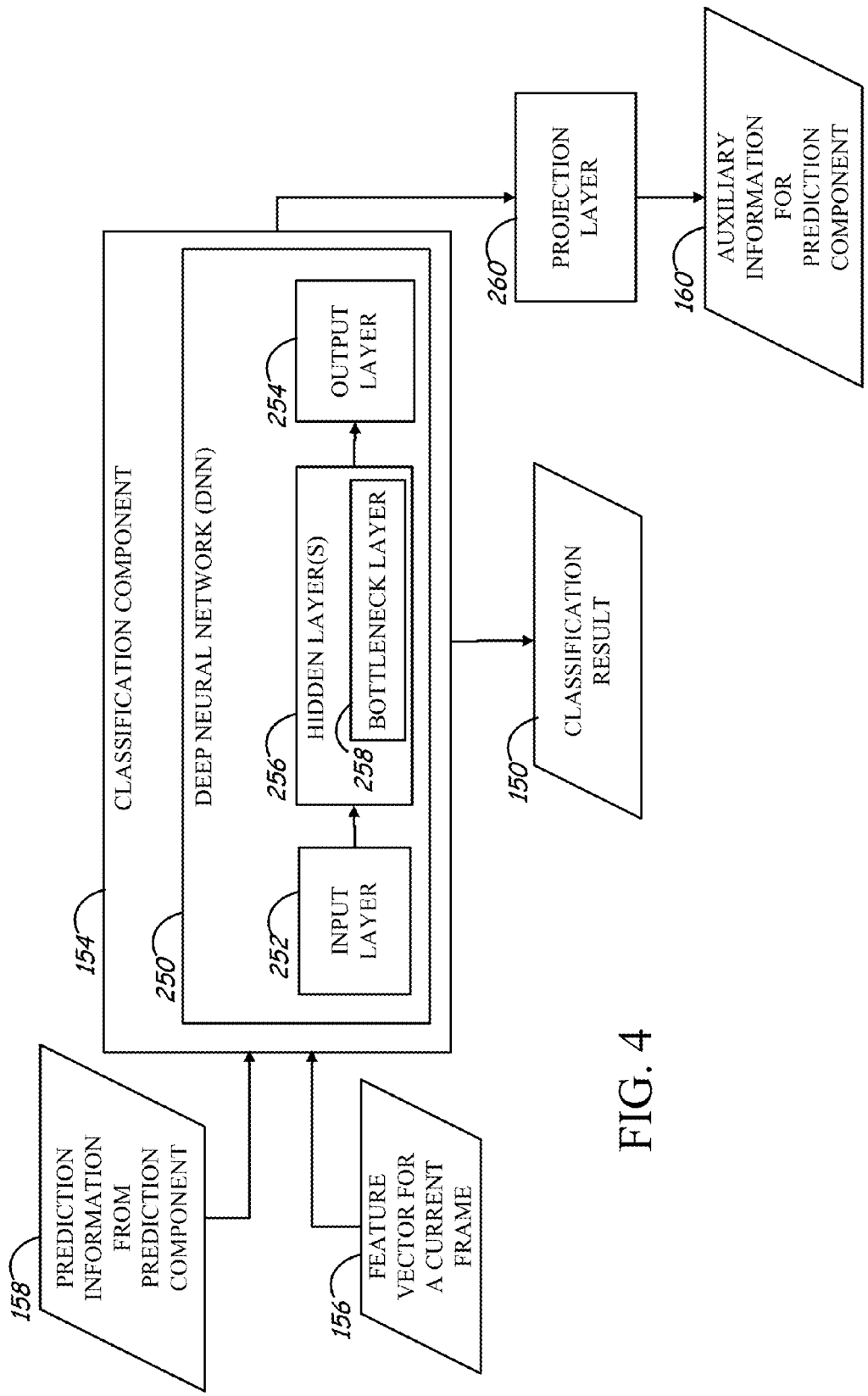
FIG. 4 is a block diagram showing one example of a neural network-based classification component.

FIG. 4 is a block diagram of one example of classification component 154. Classification component 154 includes a deep neural network (DNN) 250 having an input layer 252, an output layer 254, and one or more hidden layers 256 between input layer 252 and output layer 254. In one example, layers 252, 254, and 256 are substantially similar to layers 202, 204, and 206 discussed above with respect to FIG. 3.

Input layer 252 receives the feature vector 156 for a current frame and the prediction information 158. In one example, the information in input layer 252 is processed by one or more sigmoid layers that perform sigmoid functions within DNN 250. Based on feature vector 156 and prediction information 158, output layer 254 generates classification result 150 which, in one example, comprises a label indicative of recognition of the current frame of the input data. In one particular example, the output layer 254 of DNN 250 includes a softmax function that estimates a state posterior probability at time t (i.e., the current frame) given feature vector 156 and prediction information 158.

DNN 250 outputs auxiliary information 160 for use by prediction component 152. Auxiliary information 160 can comprise any useful information to improve the prediction functions of prediction component 152. In one example, auxiliary information 160 comprises the output from output layer 254. In another example, auxiliary information 160 comprises an output from a hidden layer 256, such as bottleneck layer 258. In one example, bottleneck layer 258 operates as a dimension reduction layer in the neural network.

A projection layer 260 can also be utilized to reduce the dimension of the features of auxiliary information 160 before providing the auxiliary information 160 to prediction component 152. Projection layer 260 can be incorporated within component 154 or can be a separate component that receives an output from classification component 154.

Referring again to FIG. 2, sequence recognizer 110 includes an output component 174 configured to output recognition result 104 based on the classification result 150 from classification component 154. In one speech recognition example, but not by limitation, recognition result 104 comprises a phoneme label that is assigned to the input speech signal, where output component 174 outputs recognition result 104 to a speech processing system, such as a speech understanding system configured to provide an interpreted meaning of an utterance. These, of course, are examples only.

Figure 5:
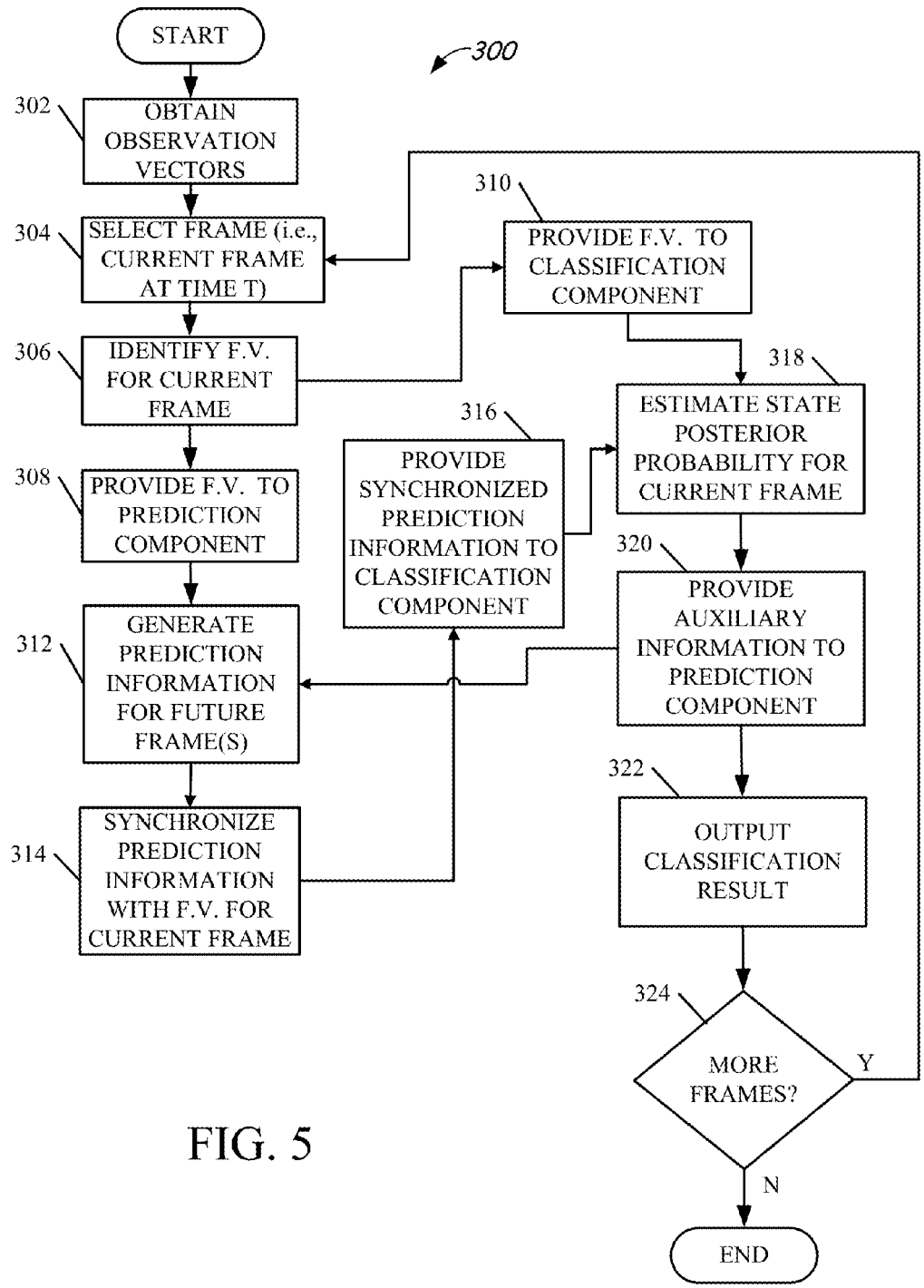
FIG. 5 is a flow diagram illustrating one example of a method for performing sequence recognition.

FIG. 5 is a flow diagram illustrating one example of a method 300 for performing sequence recognition. For sake of illustration, but not by limitation, method 300 will be described in the context of using sequence recognizer 110 to recognize speech. However, it is understood that other applications are possible. For example, sequence recognizer 110 can be utilized for character or handwriting recognition. In another example, sequence recognizer 110 can be used for predicting speaking rate, clean speech frames, and/or noise frames. For instance, in one application, feedback is generated indicative of how well the system is predicting noise free speech in the presence of ambient noise.

At block 302, observation feature vectors 108 are obtained. For example, feature vectors 108 are extracted from frames of a signal to be recognized. At block 304, a current frame at time t is selected. At block 306, the feature vector ("F.V.") 156 for the selected, current frame is identified. At block 308, the feature vector 156 for the current frame at time t (i.e., $o_t$) is provided to prediction component 152. This is represented by arrow 163 in FIG. 2. The current frame feature vector ($o_t$) 156 is also provided to classification component 154 at block 310. This is represented by arrow 164 in FIG. 2.

At block 312, prediction component 152 generates prediction information 158 for a future frame at time t+n, where t corresponds to a time of the current frame and n is a number of frames in the future. The future frame can be a next contiguous frame (i.e., n=1) or another frame in the future (i.e., n>1). In one implementation of sequence recognizer 110, but not by limitation, setting n to a relatively large number can improve the recognition accuracy. In one example, n is greater than or equal to five. In one particular example, n is set to ten. These, of course, are examples only.

Prediction component 152 generates prediction information 158 based on current frame feature vector 156 and auxiliary information 160 (which is discussed in further detail below). In one example, generating prediction information 158 comprises generating target information for future events by predicting a posterior probability:

$p_t^{pred}(l_{t+n}|o_t, y_t)$, where $o_t$ is the feature vector 156, $y_t$ is the auxiliary information 160, l is the target information which can be a state, such as a phone, and n is the number of frames as discussed above. In one example, the posterior probability is given by:

$$p_t^{pred} = f_p(o_{t-1}, \ldots, o_{t-n}, h_{t-1}, \ldots, h_{t-n}), \quad \text{equation (1)}$$

where $o_t$ is the feature vector at time t and $h_t$ is a hidden state at time t.

While prediction information 158 can comprise a predicted classification for result 150 (i.e., a predicted state) made on the current frame, in one example it can include any other information that is useful to classification component 154 in generating classification result 150. In one example, prediction information 158 can comprise an output from a hidden or bottleneck layer at time t, which is represented as $h_t^{pred}$. The prediction information 158 can be indicative of a prediction of one or more events in a next or future frame. Examples include, but are not limited to, a predicted speaker identity or code (e.g., whether the frame of speech data is from a first speaker or second speaker), a predicted speaking rate, a predicted noise condition, and/or a prediction of whether the frame comprises a noise frame. In another example, the prediction information 158 can include a device identity or code. These, of course, are examples only.

Because the prediction information 158 was generated for a future frame (i.e., frame t+n), but input 164 comprises feature vector 156 for the current frame t, sequence recognizer 110 includes, in one example, a synchronization component 162 that is configured to provide frame-based synchronization of inputs 164 and 166 to classification component 154. In other words, synchronization component 162 operates to synchronize operation of prediction component 152 and classification component 154. This is shown at blocks 314 and 316 in FIG. 5. While synchronization component 162 is illustrated as a separate block in FIG. 2, it is noted that in one example synchronization component 162 can be integrated into prediction component 152.

By way of example, at block 314, synchronization component 162 receives the prediction information 158 and implements a delay function 168 to generate synchronized prediction information 172, which is provided to classification component 154 as input 166. In a relatively simplified example, the synchronized prediction information 172 (represented as $x_t$) comprises a prediction made on a given frame in the past (i.e., $x_t = h_{t-1}^{pred}$). Synchronization component 162 can include, in one implementation, a data store that temporarily stores the prediction information ($h_t^{pred}$) for a given number of frames, before it is provided to classification component 154.

To exploit additional predictions made in the past, synchronization component 162 can implement a context expansion function 170 that stores, and then combines or stacks multiple hidden layer values into a single input function. For example, the synchronized prediction information 172 can be given by:

$$x_t = [h_{t-T^{class}}^{pred}, \ldots, h_{t-1}^{pred}]^T, \quad \text{equation (2)}$$

where $T^{class}$ is a contextual window size used by the classification component 154. In one example, in which $T^{class}$ is set to ten, the synchronized prediction information ($x_t$) 172 includes a window of stacked hidden layer values for the ten frames prior to the current frame at time t.

At block 318, classification component 154 estimates the state posterior probability $p_t^{class}(s_t|o_t, x_t)$ for frame t, where $o_t$ is the feature vector 156 and $x_t$ is the synchronized prediction information 172. In one example, but not by limitation, classification component 154 concatenates the prediction information 172 with the feature vector 156 to create a larger feature vector that is processed by classification component 154. Alternatively, or in addition, prediction information 172 can be incorporated into classification component 154 by using a mask and/or dynamically changing the weights of classification component 154 based on prediction information 172.

At block 320, classification component 154 provides feedback to prediction component 152 in the form of auxiliary information 160. Illustratively, auxiliary information 160 comprises any suitable information that can be used to improve the behavior of prediction component 152 in generating prediction information 158. In this manner, the behavior of prediction component 152 is also able to adapt dynamically during the classification process.

In one example of block 320, a dimension of the features of auxiliary information 160 is reduced before providing the auxiliary information 160 as an input to prediction component 152. For instance, a projection layer, such as layer 260 illustrated in FIG. 4, can be utilized to project a hidden layer output $h_t^{class}$ from classification component 154 to a lower dimension.

Further, in one example, hidden layer output values for a plurality of frames can be combined or stacked in a manner similar to context expansion function 170. In one example, auxiliary information 160 can be given by:

$$y_t = [h_{t-T^{pred}-1}^{class}, \ldots, h_t^{class}]^T, \quad \text{equation (3)}$$

where $T^{pred}$ is a contextual window size used by prediction component 152. In one example, in which $T^{pred}$ is set to 1.

At block 322, classification component 154 generates classification result 150, based on the state posterior probability, to assign a state label to the current frame. At block 324, the method determines whether there are any additional frames to be classified. If so, the method returns to block 304 to process a next frame.

Figure 6:
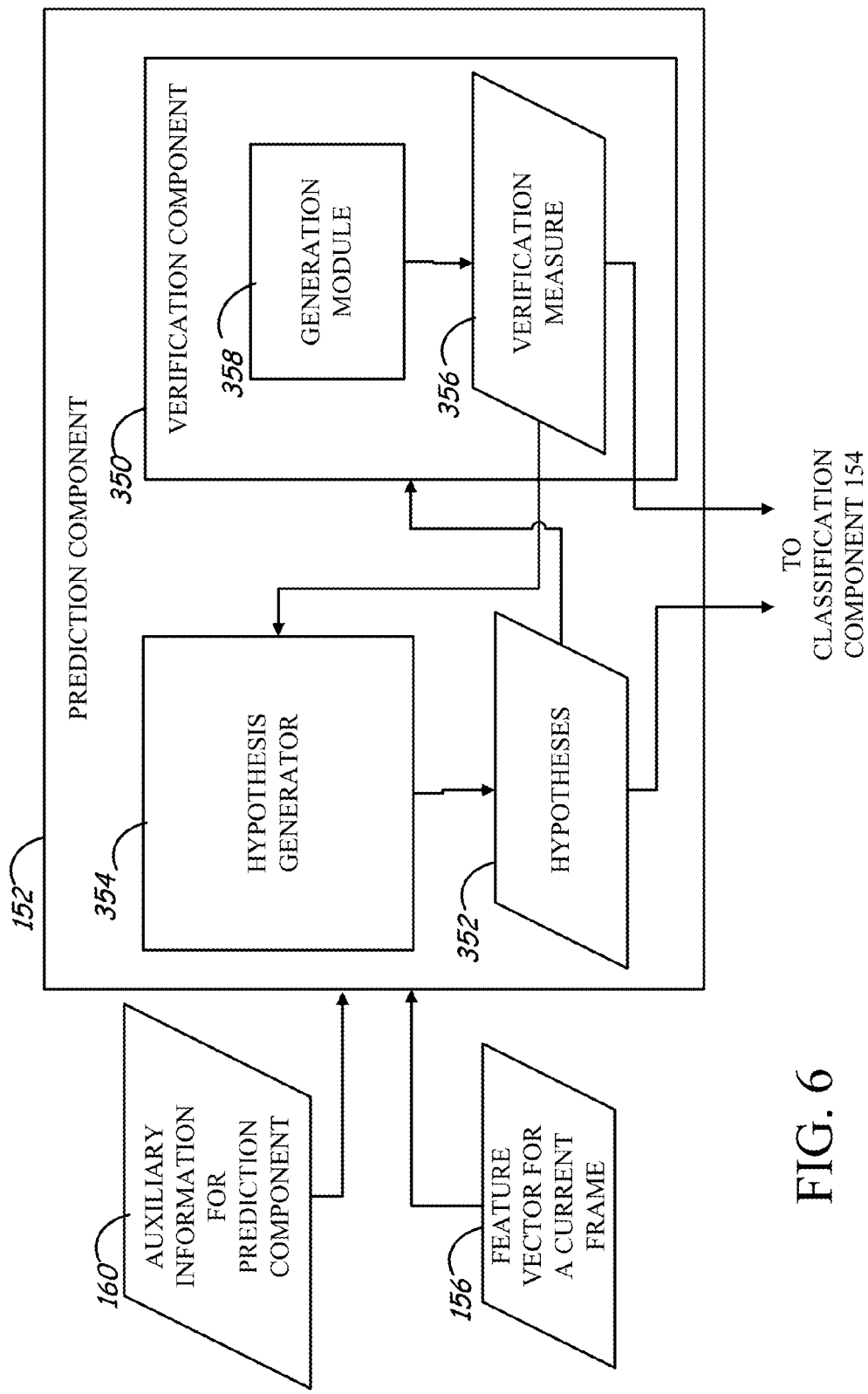
FIG. 6 is a block diagram showing one example of a prediction component having a verification component.

In one example, sequence recognizer 110 is configured to verify the prediction made by prediction component 152. Accordingly, FIG. 6 is a block diagram of one example of prediction component 152 having a verification component 350. While verification component 350 is illustrated as being integrated into prediction component 152, in one example verification component 350 can be separate from prediction component 152.

As illustrated in FIG. 6, a hypothesis 352 is generated by a hypothesis generator 354. For example, but not by limitation, a neural network, such as DNN 200, receives feature vector 156 and auxiliary information 160, and generates a prediction for the current frame. Hypothesis 352 can include a predicted state label for the current frame, such as a predicted phoneme label, as well as other prediction information such as a predicted event (e.g., speaker identity, speaking rate, noise, etc.).

Verification component 350 evaluates hypothesis 352 to generate a verification measure 356. In one example, verification measure 356 is indicative of a quality or confidence of hypothesis 352 relative to the observation, which is fed back to hypothesis generator 354 to improve hypothesis 352 before it is provided to classification component 154. In one example, verification measure 356 is used by hypothesis generator 354 to make hypothesis 352 better match the observation.

In one example, verification measure 356 comprises a likelihood measure, and can be in the form of a numerical likelihood score that indicates how likely hypothesis 352 is an accurate prediction of the observation. Alternatively, or in addition, verification measure 356 can include information related to the predicted state of hypothesis 352 that is generated by a generation module 358.

For sake of illustration, but not by limitation, in one example hypothesis generator 354 receives feature vector 156 for a current frame having speech from two different speakers. Hypothesis generator 354 predicts the separated speech and the verification measure 356 is indicative of how well the combination of the two predicted separated speech streams form the observed input.

Further, in one example input speech is received in the presence of noise, which can make predicting the label difficult. Prediction component 152 generates a first prediction from the noisy speech indicative of the clean speech without the noise. Additionally, prediction component 152 generates a second prediction from the noisy speech indicative of the noise without the speech. Then, by using generation module 358 to combine the two predictions and determine whether the combination equals the input signal, verification measure 356 indicates whether the prediction is considered accurate. This information can be used to refine hypothesis generator 354.

As shown in FIG. 6, both the hypothesis 352 and the verification measure 356 can be output to classification component 154 for use in classifying the current frame. By way of example, classification component 154 can use verification measure 356 as an indication whether hypothesis 352 has a high or low likelihood, for use in correcting hypothesis 352. For example, but not by limitation, hypothesis 352 and verification 356 can collectively indicate that there is a high likelihood that the input signal includes speech from two different speakers. Using this information, classification component 154 can break the input into two different speech streams for processing.

A sequence recognizer, such as recognizer 110, can be trained in a wide variety of ways. In one example, training involves using labeled training data to solve a multi-task learning problem. A plurality of training objectives can be combined into a single training objective function. For instance, a prediction objective can be incorporated into the training criterion.

Figure 7:
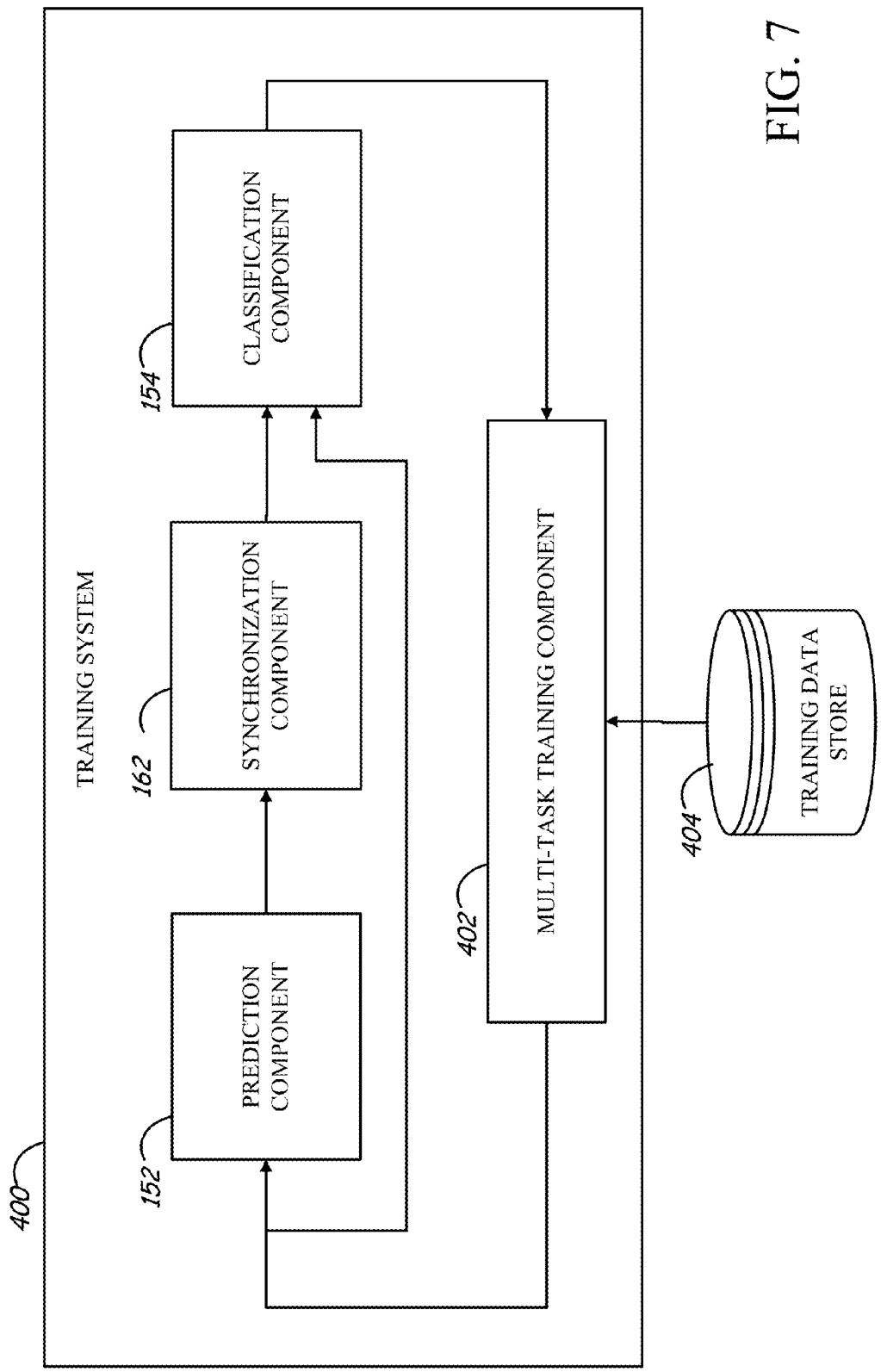
FIG. 7 is a block diagram showing one example of a sequence recognizer training system.

FIG. 7 is a block diagram showing one example of a training system 400. For sake of illustration, but not by limitation, training system 400 will be described in the context of training sequence recognizer 110. In the example shown in FIG. 7, some items are similar to those shown in FIG. 2 and they are similarly numbered.

Training system 400 includes a multi-task training component 402 that obtains labeled training data from a training data store 404. Training data store 404 can be local to training system 400 or can be remotely accessed by training system 400.

The manner in which the training data is labeled can depend on the particular configuration of sequence recognizer 110. In the illustrated example, classification component 154 estimates the state posterior probability. Accordingly, each frame of the training data can include a state label and a frame cross-entropy (CE) criterion for training classification component 154. Further, in the illustrated example, prediction component 152 is configured to predict a state label for a next frame. Accordingly, a state label for each frame of training data can be used to train prediction component 152. In another example, prediction component 152 is configured to predict a plurality of different events. For example, prediction component 152 can be configured to predict speaker and noise. Accordingly, each frame of the training data can include labels for speaker and noise. If information is missing from a frame of the training data, the cost of the corresponding frame is assumed to be zero, in one example.

In the illustrated example, multi-task training component 402 provides the training data as input to prediction component 152 and classification component 154 with the objective function of equation (4):

$$J = \Sigma_{t=1}^{T} (\alpha * p^{class}(s_t | o_t, x_t) + (1-\alpha) * p^{pred}(l_{t+n} | o_t, y_t)), \quad \text{equation (4)}$$

where $\alpha$ is an interpolation weight that sets a relative importance of each criterion and T is the total number of frames in the training utterance. In one example, $\alpha$ is set to 0.8. Training component 402 illustratively uses the objective function of equation (4) and trains prediction component 152 and classification component 154 to optimize the objective function. In one example, training component 402 trains prediction component 152 and classification component until the learning no longer improves, or until the improvement is below a given threshold. This is an example only.

Equation (4) incorporates both prediction and classification objectives into the training criterion. Of course, depending on the configuration of the sequence recognizer more than two objectives can be optimized.

In one example, prediction component 152 and classification component 154 are first separately trained prior to training them with multi-task training component 402. Further, during training the state posteriors (or the scaled likelihood scores converted for them) from the classification component 154 can be treated as an emission probability.

It can thus be seen that the present description provides a wide variety of technical advantages. For example, but not by limitation, it provides a machine learning architecture for a classifier that leverages a prediction on observed features to generate a classification result. The architecture incorporates prediction, adaptation, generation, and correction in a unified framework to support sequence recognition in a manner that improves the accuracy of state predictions. In an illustrated example, a plurality of different neural network-based components are implemented in a recurrent loop, in which the components are dynamically adapted and corrected to improve the classification result. In a speech application, the framework can significantly improve phone recognition accuracy. This can provide a further technical advantage when the recognition in fed into another system (such as, but not limited to, an audio indexing system, noise suppression system, natural language understanding system) by enhancing accuracy of those systems. This is but one example.

The present discussion mentions processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays or user interfaces are discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
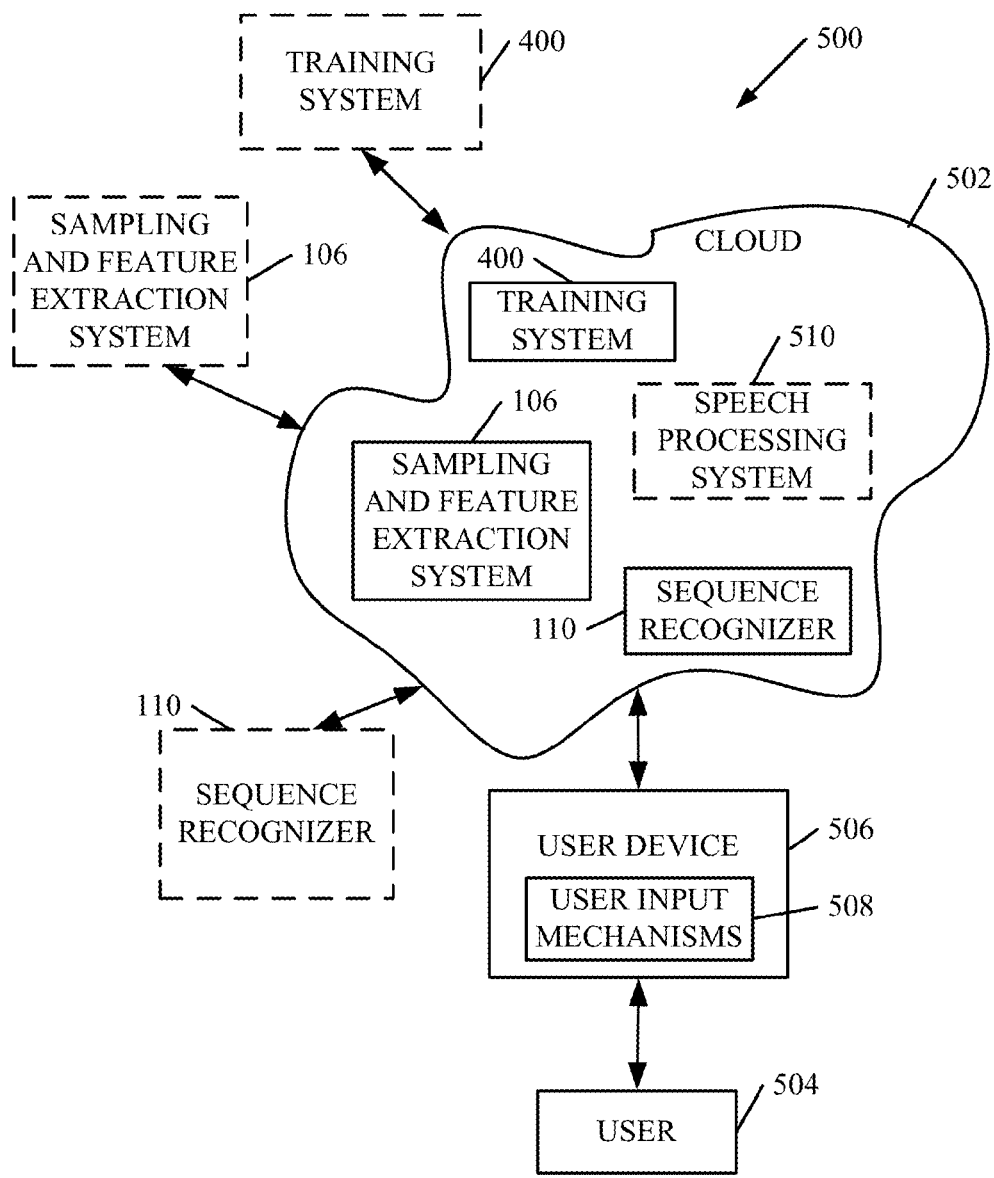
FIG. 8 is a block diagram showing one example of the system illustrated in FIG. 1, deployed in a cloud computing architecture.

FIG. 8 is a block diagram of sequence recognition system 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software, modules, or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the modules, components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that sampling and feature extraction system 106 and sequence recognizer 110 can be located in cloud 502 (which can be public, private, or a combination where portions are public while others are private). Therefore, a user 504 uses a user device 506 to access those systems through cloud 502. User 504 provides inputs using user input mechanisms 508 on user device 506. Also, in one example, training system 400 can be located in cloud 502.

By way of example, but not by limitation, sampling and feature extraction system 106 and sequence recognizer 110 can be implemented as part of a speech processing system 510, which is used by user 504 and/or one or more other users (not shown in FIG. 8) for speech processing. Speech processing system 510 can be a wide variety of different types of speech processing systems, that performs a variety of different types of speech processing. For instance, it can be a speaker recognition system, and audio indexing system, a speech recognition system, an automatic transcription system, a speech understanding system, among a wide variety of others. For example, for speech recognition, user 504 uses input mechanism 508 (e.g., a microphone) to provide a speech signal to system 510 and receives a recognition result indicative of a recognition of the speech signal.

FIG. 8 also depicts another example of a cloud architecture. FIG. 8 shows that it is also contemplated that some elements of system 100 can be disposed in cloud 502 while others are not. By way of example, sampling and feature extraction system 106 can be disposed outside of cloud 502, and accessed through cloud 502. In another example, sequence recognizer 110 can also be outside of cloud 502. In another example, training system 400 can also be outside of cloud 502. Regardless of where they are located, they can be accessed directly by device 506, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
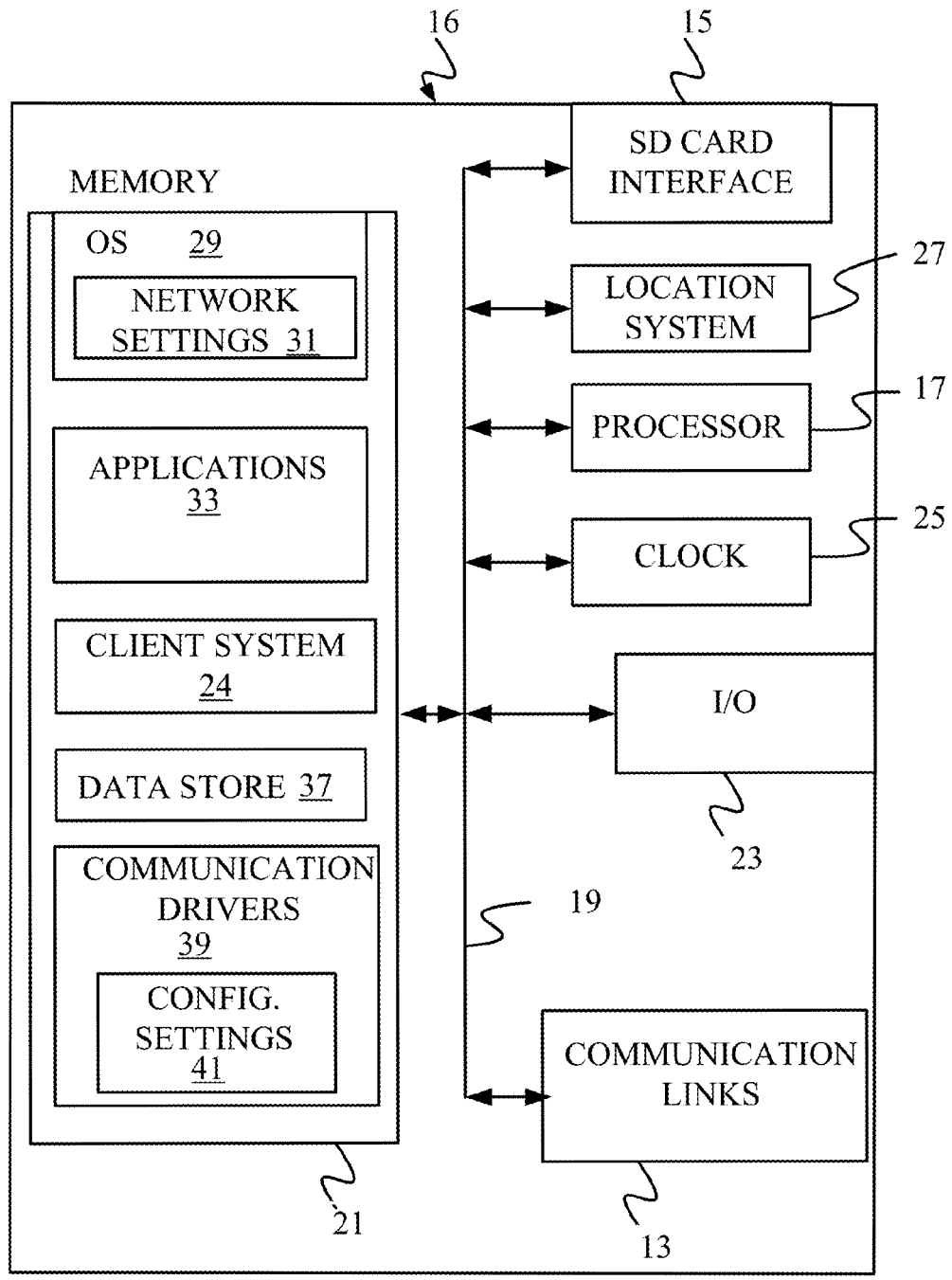
FIGS. 9-13 show various examples of mobile devices that can be used with the architecture shown in FIG. 1.

FIG. 9 is a simplified block diagram of one example of a handheld or mobile computing device that can be used as a user's or client's hand held device 16, in which the present system (or parts of it) can be deployed. FIGS. 10-13 are examples of handheld or mobile devices.

FIG. 9 provides a general block diagram of the components of a client device 16 that can run modules or components of system 100 or that interacts with system 100, or both. In the device 16, a communications link 13 is provided that allows the handheld device to communicate with other computing devices and in some examples provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processor(s) 112 from FIG. 1) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 comprises a real time clock component that outputs a time and date. It can also provide timing functions for processor 17.

Location system 27 includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. It can also store a client system 24 which can be part or all of system 100. Memory 21 can include all types of tangible volatile and nonvolatile computer-readable memory devices. It can also include computer storage media (described below). Memory 21 stores computer readable instructions that, when executed by processor 17, cause the processor to perform computer-implemented steps or functions according to the instructions. Processor 17 can be activated by other modules or components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 10:
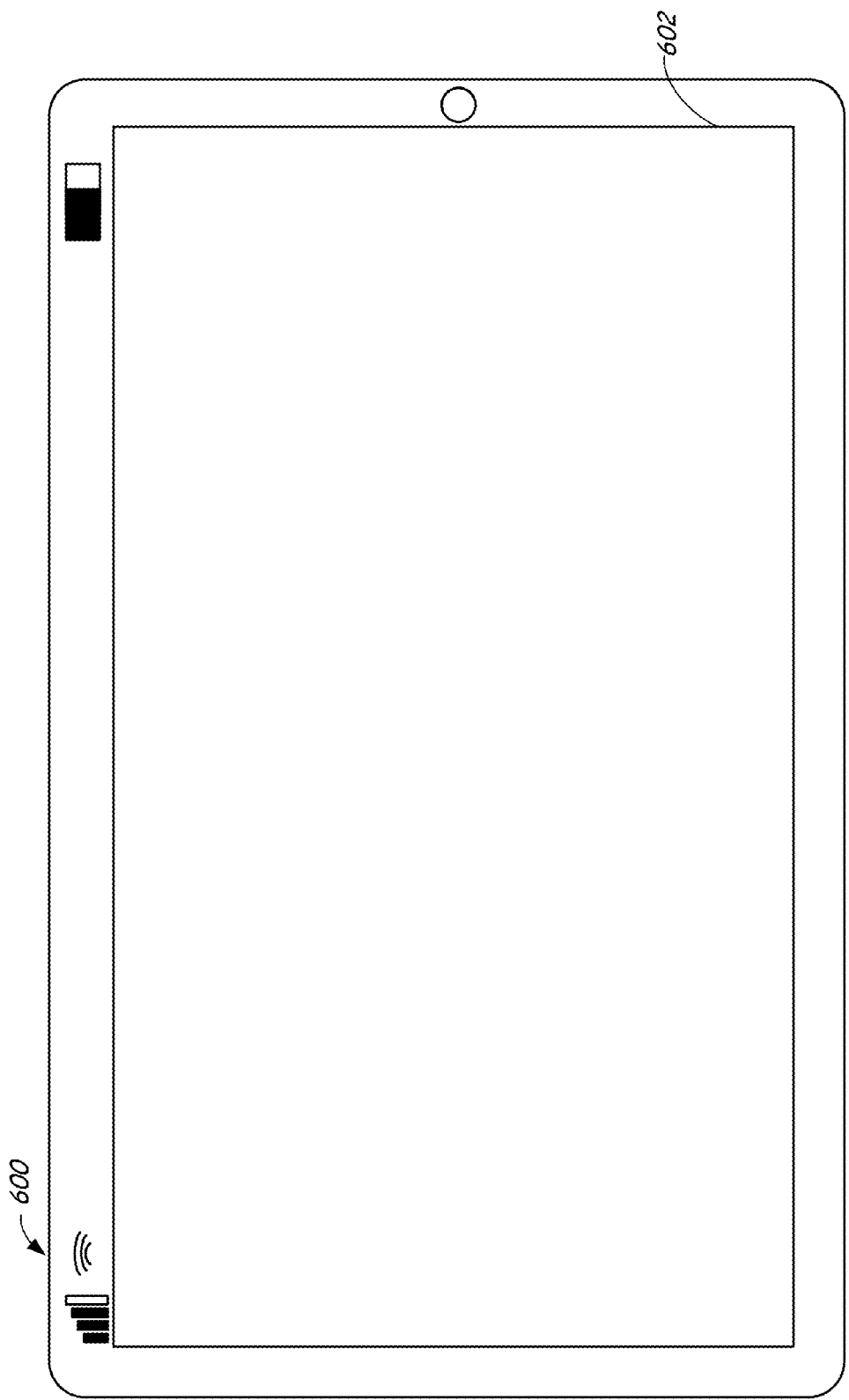

FIG. 10 shows one example in which device 16 is a tablet computer 600. In FIG. 10, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also receive voice inputs as well.

Figure 11:
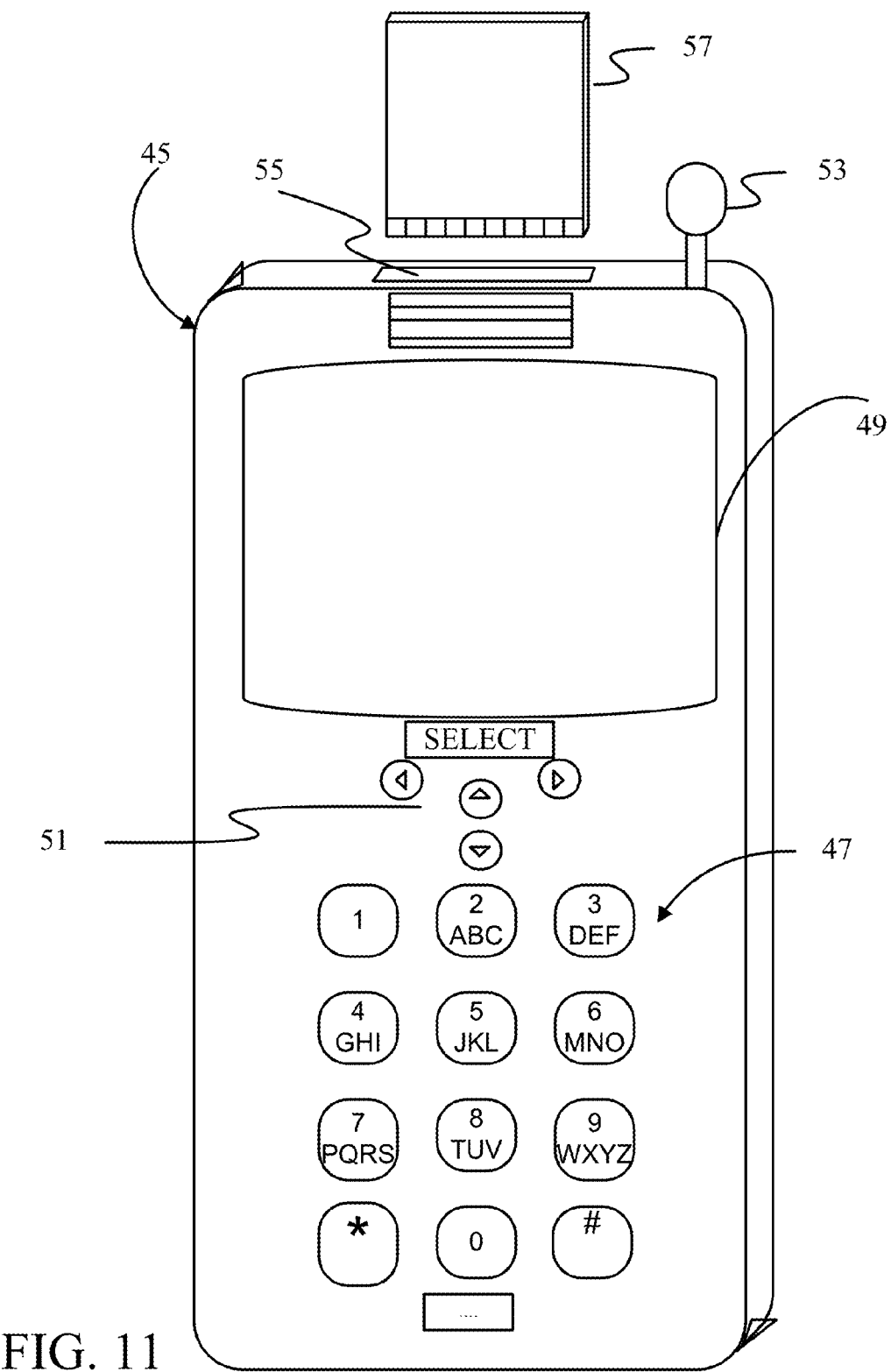
Figure 12:
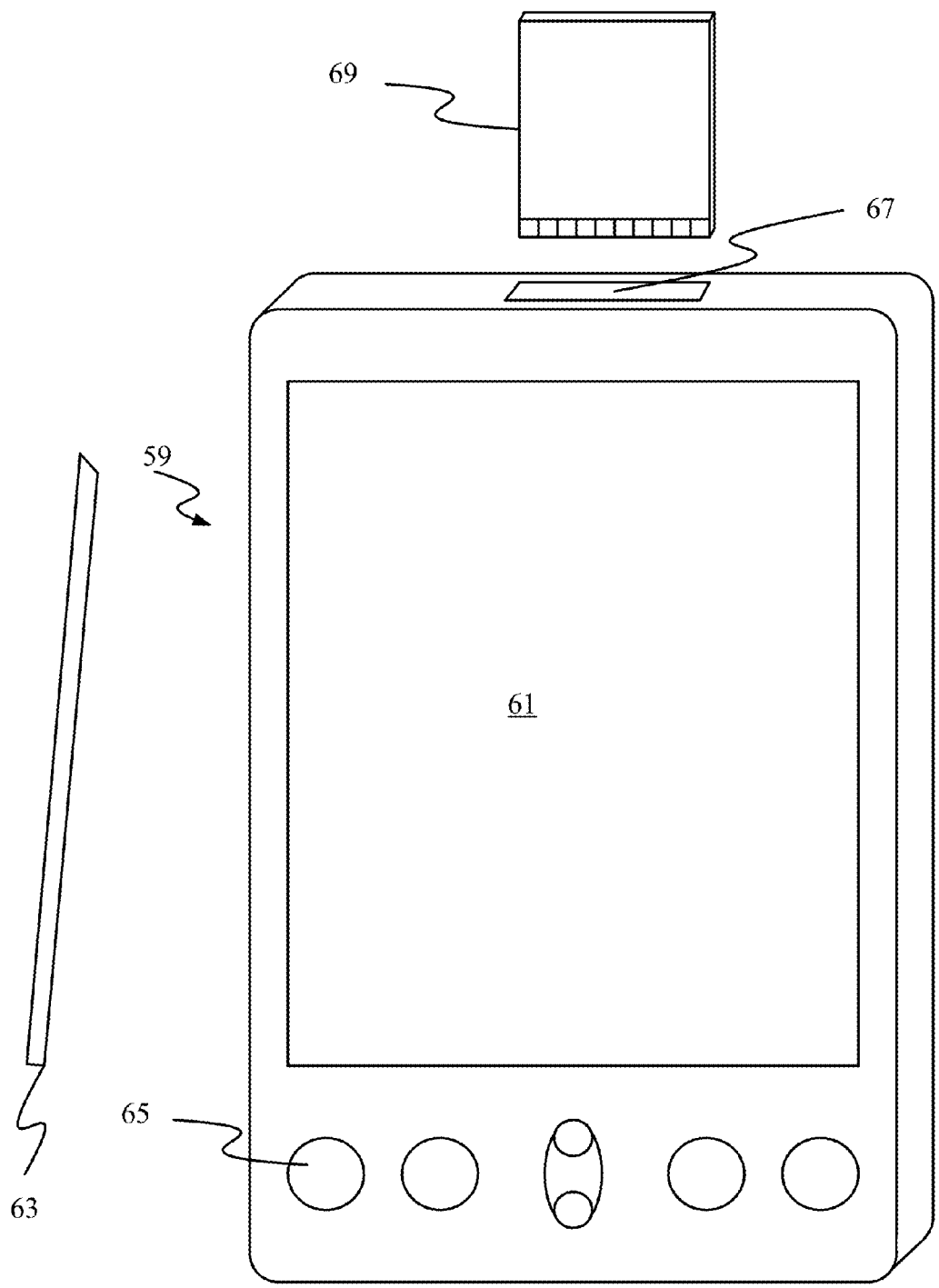

FIGS. 11 and 12 provide additional examples of devices 16 that can be used, although others can be used as well. In FIG. 11, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1×rtt, and Short Message Service (SMS) signals. In some examples, phone 45 also includes a Secure Digital (SD) card slot 55 that accepts a SD card 57.

The mobile device of FIG. 12 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one example, mobile device 59 also includes a SD card slot 67 that accepts a SD card 69.

Figure 13:
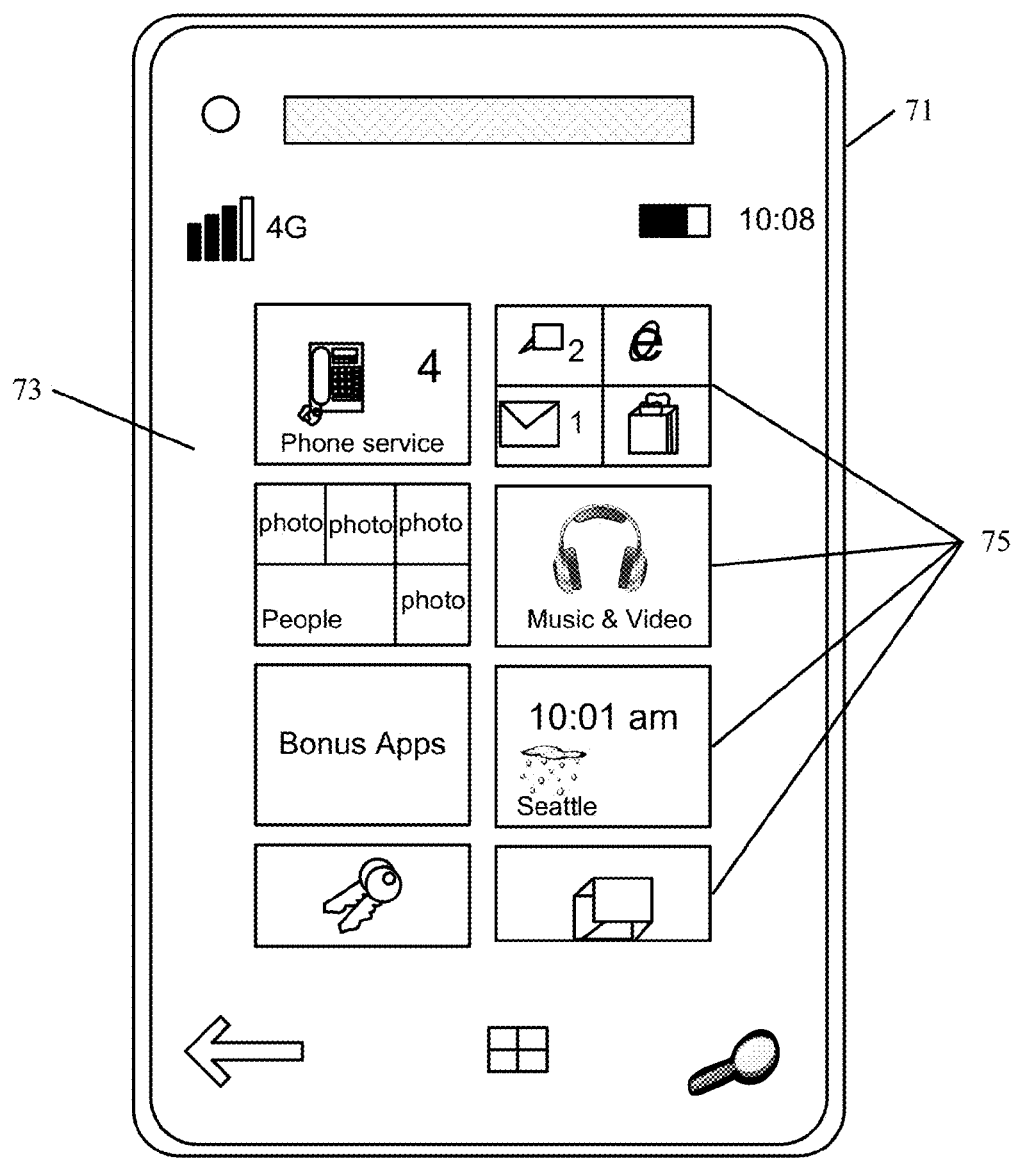

FIG. 13 is similar to FIG. 11 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 14:
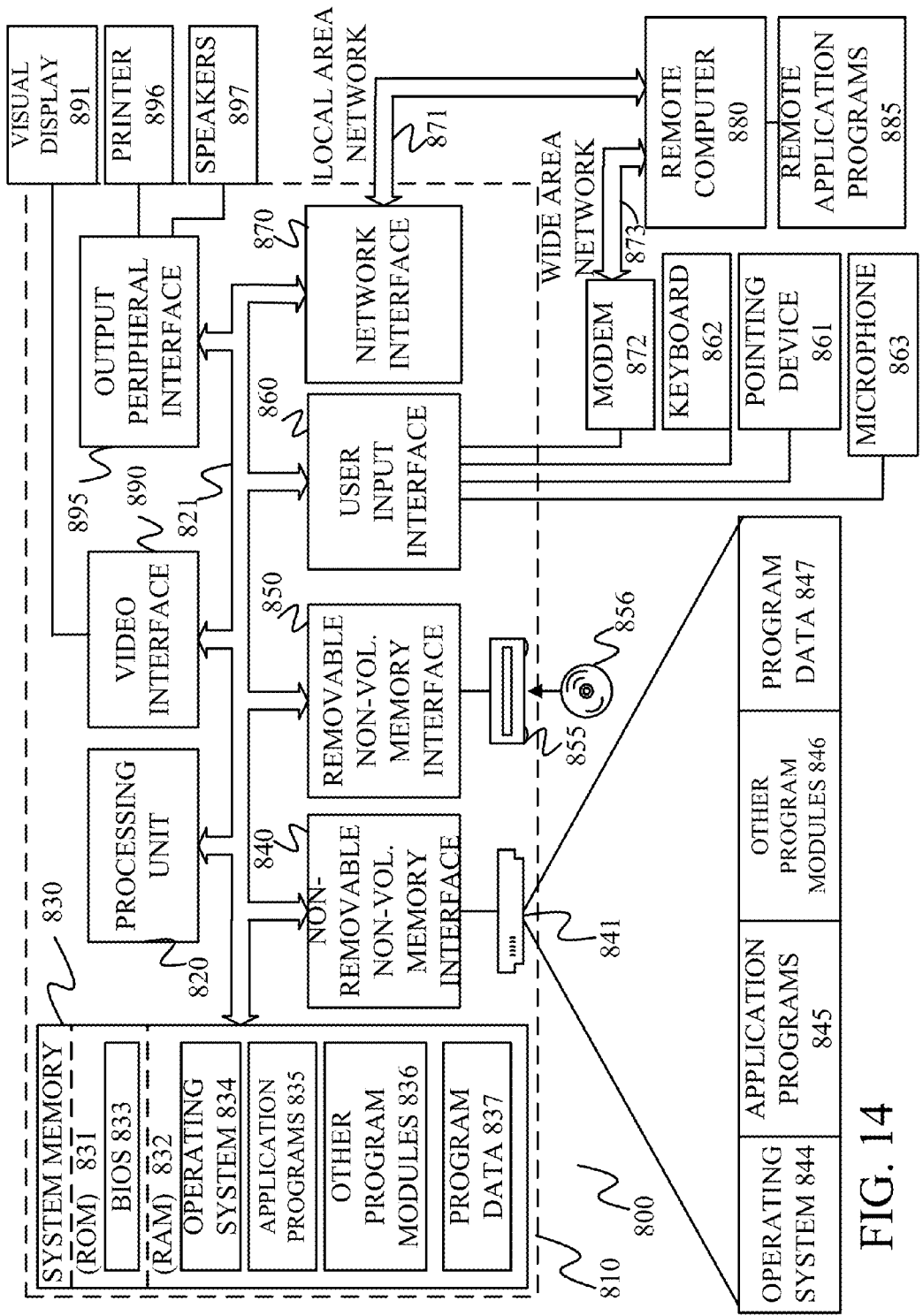
FIG. 14 is a block diagram of one example computing environment.

FIG. 14 is one example of a computing environment in which system 100, or parts of it, (for example) can be deployed. With reference to FIG. 14, an exemplary system for implementing some examples includes a general-purpose computing device in the form of a computer 810. Components of computer 810 may include, but are not limited to, a processing unit 820 (which can comprise processor(s) 112), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 14.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 14 illustrates operating system 834, application programs 835, other program modules 836, and program data 837.

The computer 810 may also include other removable/non-removable volatile/nonvolatile computer storage media. By way of example only, FIG. 14 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 14, provide storage of computer readable instructions, data structures, program modules and other data for the computer 810. In FIG. 14, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 14 include a local area network (LAN) 871 and a wide area network (WAN) 773, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 14 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. For instance the examples discussed in the following paragraphs can be combined in any combination of examples. All of this is contemplated herein.

Example 1 is a sequence recognition system comprising a prediction component configured to receive (or means for receiving) a set of observed features from a signal to be recognized and to output a prediction output indicative of a predicted recognition based on the set of observed features. The sequence recognition system also comprises a classification component configured to receive the prediction output and to output (or means for outputting) a label indicative of recognition of the signal based on the prediction output.

Example 2 is the sequence recognition system of any or all previous examples, wherein the label comprises a state label, and the classification component is configured to classify the signal by outputting the state label based on observed features from the signal and the prediction output from the prediction component.

Example 3 is the sequence recognition system of any or all previous examples, wherein the classification component is configured to estimate a state posterior probability for the signal.

Example 4 is the sequence recognition system of any or all previous example, wherein the set of observed features comprise features from a first frame of the signal and the prediction output is indicative of a predicted recognition pertaining to a second, subsequent frame of the signal.

Example 5 is the sequence recognition system of any or all previous examples, wherein the first and second frames comprise non-contiguous frames.

Example 6 is the sequence recognition system of any or all previous examples, wherein the classification component is configured to output a state label for the second frame based on a set of observed features from the second frame and the predicted output that is based on the set of observed features from the first frame.

Example 7 is the sequence recognition system of any or all previous examples, wherein the prediction output comprises a predicted event for the second frame.

Example 8 is the sequence recognition system of any or all previous examples, wherein the predicted event comprises at least one of a predicted speaker identity, a predicted speaking rate, or a predicted noise condition.

Example 9 is the sequence recognition system of any or all previous examples, wherein the predicted event comprises a predicted state label for the second frame.

Example 10 is the sequence recognition system of any or all previous examples, wherein the classification component is configured to correct the predicted state label for the second frame based on a set of observed features from the second frame.

Example 11 is the sequence recognition system of any or all previous examples, wherein the classification component is configured to receive the set of observed features from the first frame and to output feedback information to the prediction component based on classifying the first frame of the signal, and wherein the prediction component outputs the prediction output pertaining to the second frame based on the feedback information.

Example 12 is the sequence recognition system of any or all previous examples, wherein the signal comprises frames, the set of observed features comprising features from a given one of the frames, and wherein the classification component is configured to receive prediction information pertaining to a plurality of the frames, and to output a state label for the given frame based on the set of observed features and the prediction information.

Example 13 is the sequence recognition system of any or all previous examples, wherein the signal comprises a speech signal and the label comprises a phoneme label, and wherein the classification component is configured to output a recognition result for the speech signal based on the phoneme label.

Example 14 is the sequence recognition system of any or all previous examples, wherein the prediction component comprises a first neural network and the classification component comprises a second neural network.

Example 15 is the sequence recognition system of any or all previous examples, wherein the prediction output is obtained from a bottleneck layer of the first neural network.

Example 16 is the sequence recognition system of any or all previous examples, wherein the classification component is configured to output feedback information to the prediction component, the feedback information being obtained from a bottleneck layer of the second neural network.

Example 17 is a computing system comprising a sequence recognizer, the sequence recognizer comprising a prediction component and a classification component. The sequence recognizer is configured to receive (or means for receiving) a set of observed features from a signal to be recognized and to output (or means for outputting) a recognition result indicative of recognition of the signal. The computing system also comprises a training component configured to obtain labeled training data and apply the labeled training data as input to the prediction component and the classification component, to train (or means for training) the prediction component and classification component using a multi-objective training function.

Example 18 is the computing system of any or all previous examples, wherein the multi-objective training function incorporates a prediction objective and a classification objective into an objective function that is optimized by the training component.

Example 19 is a computer-readable storage medium that stores computer-executable instructions which, when executed by a computer, cause the computer to perform a method comprising identifying (or means for identifying) a signal to be recognized, the signal comprising a plurality of frames, each frame having a set of observed features, generating (or means for generating) a prediction output based on the set of observed features for a first one of the frames, the prediction output being indicative of a prediction for a second one of the frames, and generating (or means for generating) a recognition output by assigning a label to the second frame based on the prediction output and the set of observed features for the second frame.

Example 20 is the computer readable storage medium of any or all previous examples, wherein the prediction output is indicative of a predicted state label for the second frame. The method further comprises generating (or means for generating) feedback based on generating the recognition output, and generating (or means for generating) a second prediction output based on the feedback and the set of observed features for the second frame, the second prediction output being indicative of a prediction for a third one of the frames.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
   at least one processor; and
   memory storing instructions executable by the at least one processor, wherein the instructions configure the computing system to provide a prediction component, a classification component, and a synchronization component;
   wherein the prediction component is configured to:
      identify a speech signal to be recognized, the speech signal comprising at least a first frame and a second frame that is subsequent to the first frame in the signal, wherein the first frame comprises a first set of observed features and the second frame comprises a second set of observed features;
      based on the first set of observed features, generate a prediction output indicative of a predicted phoneme label that is assigned to the second frame, the predicted phoneme label being indicative of a predicted phoneme for the second frame;
   wherein the classification component is configured to:
      receive the prediction output indicative of the predicted phoneme label assigned to the second frame;
      receive the second set of observed features;
      based on the predicted phoneme label and the second set of observed features, correct the predicted phoneme label assigned to the second frame; and
      output a recognition result for the speech signal based on the phoneme label; and
   wherein the synchronization component is configured to:
      receive the prediction output from the prediction component;
      perform a synchronization operation that implements a delay function on the prediction output, wherein the delay function synchronizes the prediction output and the second set of observed features received by the classification component; and
      provide the prediction output to the classification component.

2. The computing system of claim 1, wherein the classification component is configured to:
   classify the signal by assigning the phoneme label to the second frame.

3. The computing system of claim 2, wherein the classification component is configured to estimate a state posterior probability for the signal.

4. The computing system of claim 1, wherein the first and second frames comprise non-contiguous frames in the signal.

5. The computing system of claim 1, wherein the classification component is configured to:
   receive the first set of observed features from the first frame;
   generate feedback information based on classifying the first frame of the signal; and
   generate the recognition result pertaining to the second frame based on the feedback information.

6. The computing system of claim 1, wherein the prediction component comprises a first neural network and the classification component comprises a second neural network.

7. The computing system of claim 6, wherein the predicted phoneme label is obtained from a bottleneck layer of the first neural network.

8. The computing system of claim 6, wherein the classification component is configured to output feedback information to the first neural network, the feedback information being obtained from a bottleneck layer of the second neural network.

9. A computing system comprising:
   at least one processor; and
   memory storing instructions executable by the at least one processor, wherein the instructions, when executed, provide:

a sequence recognizer comprising:
   a prediction component configured to:
      receive a first set of observed features from a first frame of a speech signal to be recognized; and
      base on the first set of observed features, generate a prediction output indicative of a predicted phoneme label for a second frame of the signal;
   a synchronization component configured to:
      receive the prediction output from the prediction component;
      perform a synchronization operation that implements a delay function on the prediction output; and
      provide the prediction output to the classification component; and
   a classification component configured to:
      receive a second set of observed features from the second frame of the speech signal:
      receive the prediction output from the synchronization component, wherein the delay function synchronizes the prediction output and the second set of observed features received by the classification component;
      based on the prediction output and the second set of observed features, correct the prediction output; and
      output a recognition result based on the corrected recognition, the recognition result being indicative of a phoneme label assigned to the second frame; and
   a training component configured to:
      obtain labeled training data; and
      apply the labeled training data as input to the prediction component and the classification component, to train the prediction component and classification component using a multi-objective training function that incorporates a prediction objective and a classification objective into an objective function.

10. The computing system of claim 9, wherein the objective function is optimized by the training component.

11. A computing system comprising:
   at least one processor; and
   memory storing instructions executable by the at least one processor, wherein the instructions configure the computing system to provide a prediction component, a classification component, and a synchronization component;
   wherein the prediction component is configured to:
      receive a speech signal to be recognized, the speech signal comprising a plurality of frames, each frame having a set of observed features from a speech input; and
      generate a prediction output based on the set of observed features for a first one of the frames, the prediction output being indicative of a predicted phoneme label for a second one of the frames that is temporally subsequent to the first frame in the speech signal; and
   wherein the classification component is configured to:
      receive the prediction output indicative of the predicted phoneme label for the second frame;
      receive the set of observed features for the second frame;
      based on the predicted phoneme label and the set of observed features for the second frame, estimate a state posterior probability for the second frame;
      based on the estimated state posterior probability, generate a recognition output by assigning a state to the second frame;
      generate feedback indicative of the generation of the recognition output; and
      provide the feedback to the prediction component, wherein machine learning is performed on the prediction component, using the feedback, to dynamically adjust performance of the prediction component in generating a subsequent prediction output;
   wherein the synchronization component is configured to:
      receive the prediction output from the prediction component;
      perform a synchronization operation on the prediction output;
      implement a delay function on the prediction output, wherein the delay function synchronizes the prediction output and the set of observed features for the second frame received by the classification component; and
      provide the prediction output to the classification component.

12. The computer-implemented method of claim 11, wherein the prediction component is configured to:
   based on the set of observed features for the first frame, predict a posterior probability of the phoneme label for the second frame; and
   assign the predicted phoneme label to the second frame based on the predicted posterior probability, and
   wherein generating a subsequent prediction output comprises generating a second prediction output based on the feedback and the set of observed features for the second frame, the second prediction output being indicative of a predicted phoneme label for a third one of the frames.

13. The computer-implemented method of claim 11, wherein the first and second frames comprise non-contiguous frames in the speech signal.

* * * * *